Dec. 23, 1952 F. PRIOR 2,622,887
VEHICLE FUEL TANK ASSEMBLY
Filed Oct. 27, 1947 3 Sheets-Sheet 1
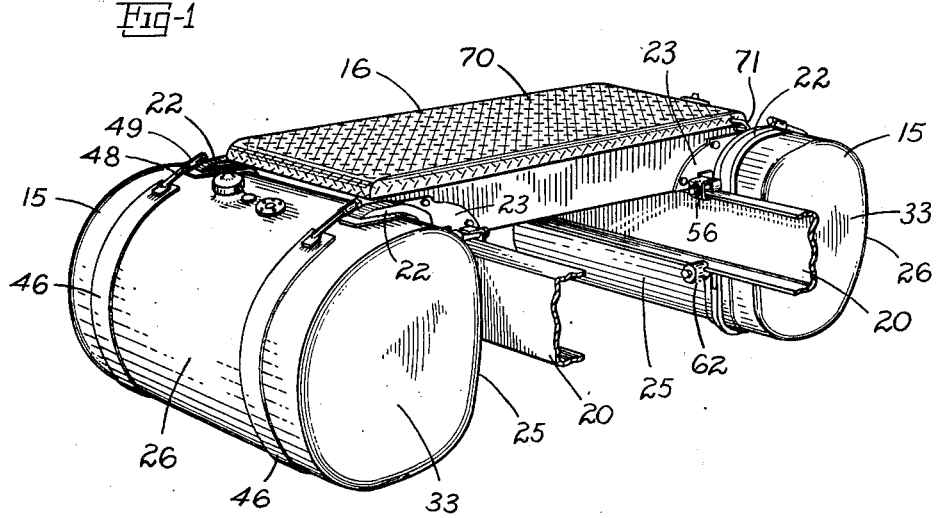
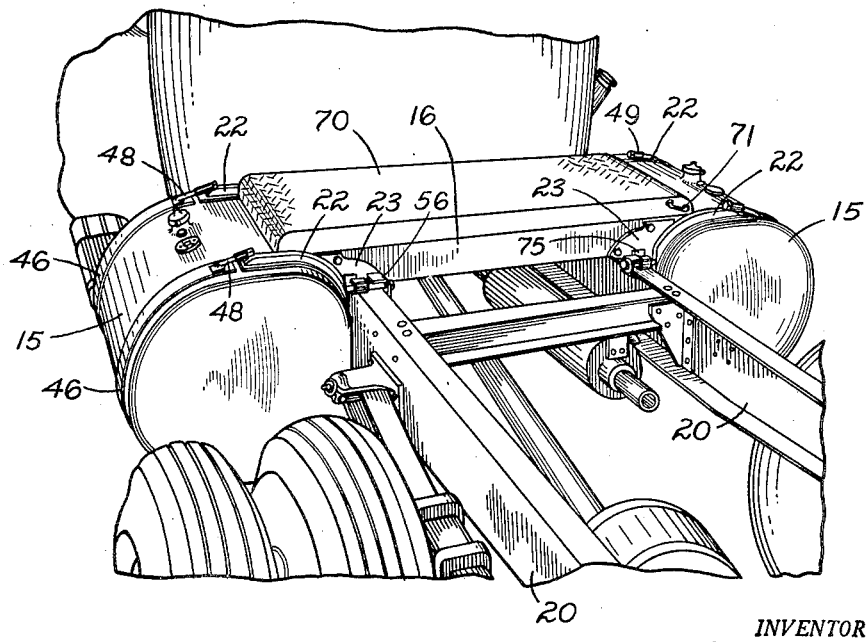
INVENTOR.
Fred Prior
BY
Marechal & Biebel
ATTORNEYS Dec. 23, 1952  F. PRIOR  2,622,887
VEHICLE FUEL TANK ASSEMBLY
Filed Oct. 27, 1947  3 Sheets-Sheet 2
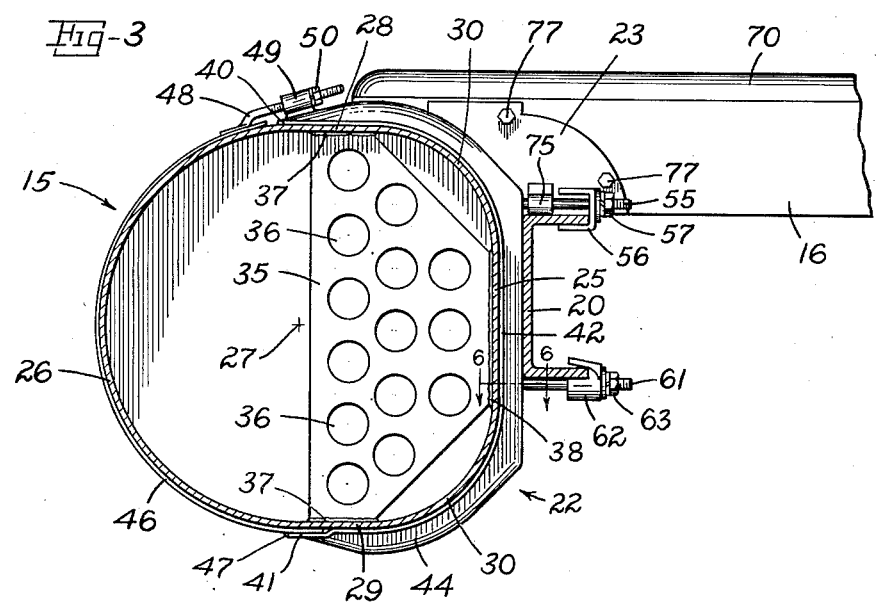

Dec. 23, 1952     F. PRIOR     2,622,887
VEHICLE FUEL TANK ASSEMBLY
Filed Oct. 27, 1947     3 Sheets-Sheet 3
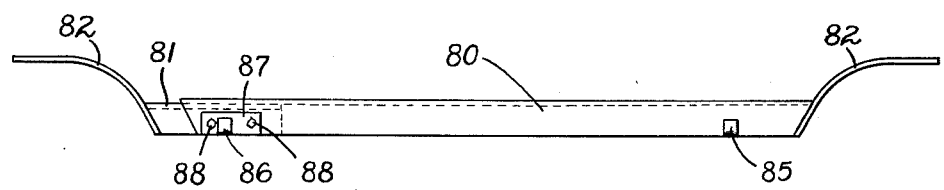
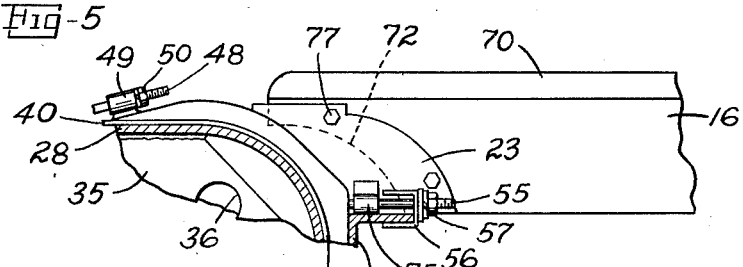
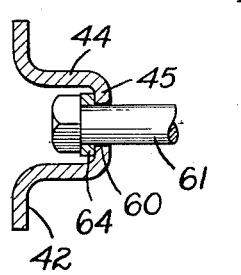
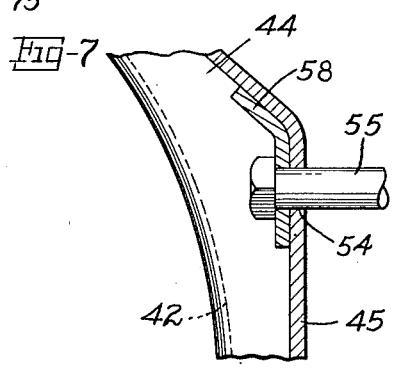
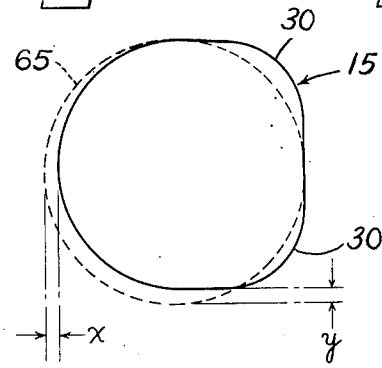
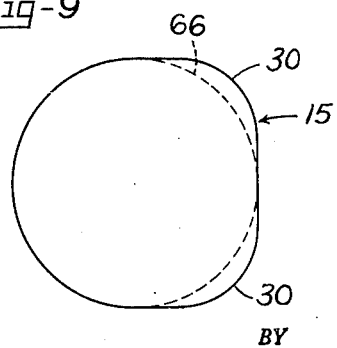
INVENTOR.
Fred Prior
BY
Marshall Biebel
ATTORNEYS Patented Dec. 23, 1952

2,622,887

UNITED STATES PATENT OFFICE 2,622,887

VEHICLE FUEL TANK ASSEMBLY

Fred Prior, Dallas, Tex.; Eva May Prior, executrix of Fred Prior, deceased, assignor to Prior Products, Inc., Dallas, Tex., a corporation of Texas Application October 27, 1947, Serial No. 782,349

12 Claims. (Cl. 280—5)

This invention relates to fuel tanks for use by trucks and like motor vehicles and also to mounting devices for such fuel tanks.

One of the principal objects of the invention is to provide a fuel tank assembly for mounting on the frame of a truck or like motor vehicle in which the tank or tanks will be supported well within the lateral outline of the rear tires for increased protection and with the center of gravity of each tank located closely adjacent the frame for improved balance and stability without sacrifice in fuel capacity.

Another object is to provide a fuel tank for a truck or like motor vehicle having one side cylindrically curved but the opposite side flattened to such configuration as to give greater capacity to the tank than is possessed by a cylindrical tank of the same radius of curvature and to afford improved characteristics of balance, stability, road clearance and general safety when the tank is mounted with the flat side adjacent a vehicle frame.

An additional object is to provide such a fuel tank having a baffle of simple and effective construction so located therein as to afford increased strength and rigidity to the tank as a whole without interfering with the proper movement of liquid fuel therein.

It is also an object of the invention to provide a mounting bracket for a vehicle fuel tank which is adapted for readily adjustable mounting on the side frame of the vehicle to fit a wide range of sizes of vehicle frames, and which is also a simple and rugged construction to support the tank in close and substantially rigid relation with the frame for increased strength and safety.

A further object is to provide a fuel tank assembly for mounting on the frame of a truck or like motor vehicle which includes a fuel tank and mounting bracket so constructed and arranged with relation to each other and to the vehicle frame that the tank is supported with its center of gravity closely adjacent the frame to minimize angular stresses in use and to afford high strength and rigidity for maximum safety during operation of the vehicle.

Still another object is to provide a fuel tank assembly for mounting on the frame of a truck or like motor vehicle which includes a platform, which may also constitute the cover of a tool chest, arranged across the frame between the fuel tanks and in adjustably connected relation with the mounting brackets for the tanks to adapt the assembly to frames of different widths.

Other objects and advantages of the invention will be apparent from the following description, the accompanying drawings and the appended claims.

In the drawings, in which like characters of reference designate like parts throughout—

Fig. 1 is a view in perspective illustrating a mounted tool box and fuel tank assembly in accordance with the invention with the mounting frame shown fragmentarily;

Fig. 2 is a perspective view showing the tool box and fuel tank assembly mounted in position on a truck;

Fig. 3 is a fragmentary view on a somewhat larger scale showing one end of the tool box and one of the mounting brackets for the fuel tanks, the tank being shown in transverse vertical section;

Fig. 4 is a view in perspective of one of the mounting brackets;

Fig. 5 is a fragmentary view similar to Fig. 3 illustrating the mounting of the assembly on a wider vehicle frame than in Fig. 3;

Fig. 6 is a detail view through one of the mounting brackets, the view being taken substantially on the line 6—6 of Fig. 3;

Fig. 7 is a detail view in vertical section through one corner of the mounting bracket;

Fig. 8 is a diagrammatic view illustrating the dimensional relation between one of the fuel tanks of the present invention and a cylindrical tank of the same length and capacity;

Fig. 9 is a similar diagrammatic view illustrating the relation in capacity between one of the fuel tanks of the present invention and a cylindrical tank of the same diameter; and Fig. 10 is a view in side elevation showing a catwalk adapted to be used in the assembly of Fig. 1 in place of the tool box.

In the drawings, which illustrate preferred embodiments of the present invention, Figs. 1 and 2 show a fuel tank assembly including a pair of tanks 15 and a tool box 16 mounted on the channel frames 20 of a truck, all of the parts of the truck except channels 20 being removed in Fig. 1 for greater clarity. As shown, each tank 15 is secured to one of channels 20 by means of a pair of brackets indicated generally at 22, and the tool box 16 rests on top of channels 20 and is connected with each bracket 22 by a bracket plate 23 which forms an adjustable connection between the tool box and bracket to adapt the assembly to vehicle frames of different widths.

The construction of each fuel tank 15 is best illustrated in Figs. 1 and 3. Each tank comprises an elongated body adapted for mounting horizontally of one of channels 20, and it has one side 25 flattened over the entire length and a substantial portion of the width thereof parallel with the outer surface of the adjacent channel 20. The opposite side 26 of the tank body is semi-cylindrical, and its center point 27 lies at the midpoint laterally of the tank. The tank body also includes flattened top and bottom portions 28 and 29, respectively, which are parallel to each other and substantially perpendicular to the flattened tank side 25. The corner portions 30 of the tank body which connect the top and bottom with the flat side 25 are cylindrically curved about a radius of curvature approximately equal to the width vertically of the flattened tank side 25, and each has an angular extent of substantially 90° and is substantially tangent at its ends to the adjacent part of the side 25 and the top or bottom of the tank. The ends 33 of each tank are belled outwardly as indicated in Figs. 1 and 2.

In order to assure adequate rigidity of the tank in use, and particularly to hold the flattened side 25 in rigid relation with the top and bottom portions, a baffle 35 is mounted within the tank at a position substantially equidistant the ends thereof, as shown in Fig. 3. This baffle extends approximately halfway across the tank laterally to assure adequate movement of fuel longitudinally of the tank, and it is provided with a plurality of holes 36 therethrough to reduce its weight. The baffle 35 has the general form of an isosceles triangle with its corners cut off, and these corners are welded to the flattened top and bottom portions of the tank and to the flat tank side at 37 and 38, respectively. The baffle 35 thus serves to secure the tank side 25 against possible tendency toward outward belling or bulging of the side under the weight of a full load of fuel while at the same time allowing free movement of the fuel within the tank to assure proper pumping or feeding to the engine, and with the brackets 22 located adjacent opposite ends of the tank, the baffle 35 cooperates therewith to reinforce the middle portion of the tank against bulging or like distortion under loaded conditions when the tank is in mounted position.

The construction and operation of the mounting brackets 22 for each fuel tank are illustrated in detail in Figs. 3 to 7. Referring first to Figs. 3 and 4, it will be seen that each bracket comprises a generally C-shaped member of cast steel or other material of suitable rigidity and includes upper and lower arm portions 40 and 41, respectively, and an intermediate portion 42. The bracket is formed with an integral channel or rib 44 extending outwardly therefrom along substantially its entire length to provide adequate stiffness, and the straight middle portion 45 of this rib 44 is adapted in use to abut the outer surface of one of channels 20. The inner surface of each bracket 22 has substantially the same configuration as the flattened side and adjacent portions of the fuel tank, and this surface of each bracket is flattened as shown in Fig. 3 for close engagement with the outer surface of the tank. Also, the arms 40 and 41 of the bracket are of sufficient length to extend outwardly beyond the vertical plane of the center of the tank as shown in Fig. 3.

In order to hold the tank in position within its mounting brackets 22, each bracket is provided with a flexible metal band or strap 46 which has one end welded at 47 to the outer end of the lower bracket arm 41. A bolt 48 is welded to the upper end of each strap 46 and is adapted to extend through a sleeve 49 similarly welded to the outer end of the upper bracket arm 40. A nut 50 on the outer end of bolt 48 provides for securing the bolt 48 in sleeve 49 to tighten the strap 46 and thus to hold the tank firmly in position within the bracket.

In order to mount each bracket 22 on one of the channel frames 20, a hole 54 is bored in the flat side 45 of rib 44 and adjacent the upper corner of the bracket as best seen in Fig. 7. A bolt 55 extends through this hole 54 and across the top of channel 20, and it is secured to the channel by means of a clip 56 of generally U-shape which extends around the inner end of the channel and is held in position by nut 57. The bracket is internally reinforced adjacent the head of bolt 55 by means of an apertured plate 58 which fits within the upper corner of rib 44 as shown in Fig. 7.

A slot 60 is formed in the lower part of rib portion 45 as best shown in Fig. 4, and a bolt 61 extends through this slot and below the channel 20 and is secured to the channel by means of clip 62 and nut 63 shown in Fig. 3. A reinforcing plate 64 is mounted between the head of bolt 61 and the inner surface of the rib 44 as shown in Fig. 6. This arrangement with slot 60 provides for simple adjustment of the bracket for ready mounting on channel frames 20 of different vertical extent.

According to common practice in the industry, the top of each fuel tank is mounted at a standard distance (4 inches) above the upper level of the channel frame. The hole 54 is accordingly so located with respect to the undersurface of the outer end of the bracket arm 40 that when the bracket is mounted, the bolt 55 will support the bracket with the top of the tank at the desired 4-inch distance above the channel. The bolt 61 is then properly adjusted in slot 60 to fit the channel as shown in Fig. 3 and to clamp the lower part of the bracket to the channel by means of clip 62.

This construction of tanks 15 and brackets 22 provides substantial advantages from the standpoint of safety as well as convenience and ease of mounting. In the first place, there is a substantial saving with respect to the cross-sectional dimensions of the tank as compared with a cylindrical tank without loss in capacity. This is illustrated in Fig. 8, which compares diagrammatically the relative dimensions of a tank 15 constructed as shown in Figs 1 and 3 with a cylindrical tank 65 of the same length and capacity. For example, and by way of illustration, a 40-gallon tank can be constructed in accordance with the invention with the length and width respectively 33 and 19 inches overall, and with the corner portions 30 curved about radii of 6 inches. In contrast, a cylindrical tank of the same length and capacity requires a diameter of 20 inches. This clear saving of an inch in cross-sectional dimensions is of material importance in affording a substantially increased margin of safety when the tank is mounted in place on a truck frame.

As already noted, it is standard practice to mount the tank with its top at a fixed distance above the top of the channel of the vehicle frame. With the tank of the present invention, therefore, the decrease in diameter in comparison with a conventional cylindrical tank provides a substantial increase in clearance between the underside of the tank and the surface of the road, as indicated by the dimension $y$ in Fig. 8. There is a corresponding lateral clearance, indicated by the dimension $x$ in Fig. 8, which is similarly important from the standpoint of safety. As shown in Fig. 2, the fuel tank assembly is commonly mounted just ahead of the rear wheels of the truck. The reduction in the lateral extent of the tank of the present invention as compared with a cylindrical tank of the same length and capacity, in the case of the specific example given above, results in bringing the outer side of each tank a full inch farther inward of the outline of the adjacent rear tires, thus substantially increasing the protection against the possibility of direct impact on the tank in the event of collision between the truck and a moving or stationary object. The protection afforded by even a small additional operating clearance either laterally or above the road is of the greatest practical importance in use in view of the likelihood of fire resulting from damage to a tank, and it will accordingly be seen that the tanks of the present invention thus contribute materially to the paramount objective of increased safety.

As stated, these advantages are gained without loss in capacity, and Fig. 9 illustrates the corresponding gain in capacity achieved in the tank of the present invention as compared with a cylindrical tank 66 of the same length and diameter. As shown in Fig. 9, the cross-sectional area of the tank 15 of the present invention is greater than that of the cylindrical tank 66 of the same diameter to the extent of the portions enclosed between the curved corners 30 of the tank 15 and the adjacent parts of the cylindrical tank. In a tank 33 inches in length and 19 inches in diameter, the resulting difference in capacity is of the order of 3 gallons, and this difference is correspondingly greater for tanks of greater length or diameter.

A further advantage from the standpoint of safety achieved by the present invention lies in the fact that the center of gravity of the tank of the invention is located materially closer to the center of the truck when mounted in use than is the case with a cylindrical tank of either the same capacity or the same diameter. Thus with a cylindrical tank of the same capacity and the above dimensions, the center of gravity will lie 10 inches outwardly of the inner side of the tank. On the other hand, in the tank of the invention the total peripheral extent of the tank portions 25, 28, 29, and 30 is substantially greater than that of the semi-cylindrical tank side 26, and the cross-sectional area to the right of the point 27 in Fig. 3 will thus be substantially greater than the corresponding area to the left of the center point 27. As a result, the center of gravity of the tank as a whole will not be located at the point 27 but instead will lie at a position spaced to the right of point 27. When the tank is mounted as shown in Fig. 3, the center of gravity will be located well inwardly of the outer end of the bracket arm 41, thus materially reducing the angular stress on the brackets 22 and frame as compared with a cylindrical tank of the same capacity and length.

As already pointed out, the fuel tank assembly in Figs. 1 to 3 includes a tool box 16, and this tool box is provided with a cover 70 having its upper surface roughened to serve as a catwalk across the vehicle frame. The cover 70 is hingedly connected to the tool box at one end and is provided with a suitable handle or handles 71 at the other end to facilitate its lifting. Each end of the tool box is curved at 72 (Fig. 5) to fit over the adjacent portion of the adjacent fuel tank when the assembly is mounted to provide a close fitting unit.

The bracket plates 23 provide a connection between the tool box and the brackets 22 which is adjustable in order to accommodate the assembly to vehicle frames of different widths. Referring particularly to Figs. 3 and 4, it will be noted that each bracket plate 23 has a small channel member 75 welded or otherwise secured thereto. This member 75 engages under the adjacent mounting bolt 55 and may then be hammered over the bolt as indicated in Fig. 4 to hold the bracket plate 23 in rigid relation with bracket 22. Each bracket plate 23 is curved at 76 (Fig. 4) to fit the upper curved corner portion 30 of the fuel tank in a manner similar to the curved part 72 of the tool box.

On vehicle frames of the minimum width for which the assembly is designed, the curved surfaces 72 of the tool box and the curved edge 76 of each bracket plate 23 will all fit against the fuel tanks, and the bracket plates are secured to the tool box by means of bolts 77 to hold all these parts in rigid relation. On vehicle frames of greater width, however, the tool box will not reach into contact with both tanks, and Fig. 5 illustrates such an installation. As shown, each bracket plate 23 remains in the same position relative to the tank and thus fills in the space which would otherwise be left between the upper corners 30 of the tank and the curved undersurfaces 72 at the ends of the tool box. For such installations, the parts are mounted and arranged in the desired positions before securing bracket plates 23 to the tool box, and the proper holes for bolts 77 are then drilled in the sides of the tool box to hold the parts firmly together.

Fig. 10 shows a catwalk which may be substituted in place of the tool box 16, and this catwalk is adjustable to fit vehicle frames of different widths. It includes a main part 80 and an end part 81 which is telescoped within part 80. Each of parts 80 and 81 of the catwalk includes a curved end portion 82 adapted to fit over the upper corner of the adjacent fuel tank in a manner similar to the curved parts 72 of the tool box. The catwalk part 80 is provided on each side with a small channel piece 85 which corresponds to a similar part 75 of each of bracket plates 23. A similar channel piece 86 is carried by a plate or strap 87 which is secured to the catwalk parts 80 and 81 by means of bolts 88. With this construction, the catwalk is mounted in position and adjusted by relative movement of parts 80 and 81 to the proper width of the frame. The holes for bolts 88 are then drilled and the straps 87 mounted in place to serve their dual function of securing the catwalk parts rigidly together and also providing for attachment by means of channel pieces 86 to the brackets which support the adjacent fuel tank.

It will accordingly be seen that the present invention provides a fuel tank assembly having material advantages not only from the standpoint of convenience but particularly from the standpoint of safety in the operation of the vehicle. The construction of the individual fuel tanks as shown and described effects a substantial increase both in road clearance and in lateral clearance without loss of fuel capacity, and also the center of gravity of each tank and its contents is located closely inwardly of the frame for improved balance and stability. The fuel tanks of the invention also offer advantages of simplified requirements with respect to mounting means, and the mounting brackets of the invention as shown and described contribute to the compactness and strength of the entire assembly. In addition, all parts of the assembly contribute to provide adjustability to vehicle frames of different widths while maintaining standard clearance and relative spacing as well as all the other advantages of the invention.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A fuel tank assembly of the character described for a motor vehicle frame comprising an elongated body adapted for mounting horizontally of said frame, one side of said body being flattened over a substantial area thereof, the side of said body opposite said flattened side being cylindrically curved about a predetermined radius, said body having flattened top and bottom portions joined to said flattened and curved sides and supporting said sides in spaced relation with each other, said top and bottom portions being of sufficient lateral extent to provide a total capacity for said tank substantially greater than the capacity of a uniformly cylindrical tank of substantially the same length and of a radius of curvature equal to said predetermined radius, supporting brackets for said tank secured thereto adjacent the ends thereof and including portions engaging said flattened side and said top and bottom portions of said tank, means on said brackets for mounting said brackets in vertical position to support said tank with said flattened side substantially vertical, a baffle located within said tank substantially equidistant the ends thereof and arranged transversely of the longitudinal axis thereof, and means securing said baffle to said flattened side and to said flattened top and bottom portions of said body for cooperation with said brackets to reinforce the middle portion of said tank under loaded conditions.

2. A fuel tank assembly of the character described adapted for mounting adjacent the frame of a motor vehicle having a flat vertical outer face, comprising an elongated body adapted for mounting horizontally of said frame, one side of said body being flattened over a substantial area thereof, the side of said body opposite said flattened side being semi-cylindrical about a predetermined radius of curvature, said body having flattened top and bottom portions extending substantially at right angles to said flattened side and spaced vertically by a distance substantially equal to twice said predetermined radius, said top and bottom portions being of such lateral extent that the cross-sectional area of said semi-cylindrical portion of said body is substantially less than the cross-sectional area of the remainder of said body, supporting brackets for said tank secured thereto adjacent the ends thereof and including portions engaging said flattened side and said top and bottom portions of said tank, means on said brackets for mounting said brackets in vertical position on said vehicle frame face to support said tank with said flattened side in close fitting relation with said face in the mounted position of said assembly, a baffle located within said tank substantially equidistant the ends thereof and arranged transversely of the longitudinal axis thereof and substantially equidistant the ends thereof, said baffle being of lesser area than the cross-sectional area of said tank to allow movement of fuel longitudinally of said tank, and means securing said baffle to said flattened side and to said flattened top and bottom portions of said body for cooperation with said brackets to reinforce the middle portion of said tank under loaded conditions.

3. A fuel tank assembly of the character described adapted for mounting on a motor vehicle frame, comprising an elongated body adapted for mounting horizontally of said frame, one side of said body being flattened over a substantial area thereof, the side of said body opposite said flattened side being cylindrically curved, said body having flattened top and bottom portions joined to said flattened and curved sides and supporting said sides in spaced relation, a pair of brackets for securing said tank to said frame, each said bracket including a generally C-shaped portion of substantially rigid material having upper and lower arms adapted to engage said top and bottom portions of said tank and a straight intermediate portion adapted to engage said flattened side of said tank, said lower arm extending laterally with respect to said intermediate portion in underlying and supporting relation with the underside of said tank body, an adjustable strap member for connecting the ends of said arms of each said bracket to encircle and hold said tank in said bracket, means for securing each said bracket to said frame and with said lower arm of said bracket in supporting relation with said tank, a baffle located within said tank substantially equidistant the ends thereof and arranged transversely of the longitudinal axis thereof, means securing said baffle to said flattened side and to said top and bottom portions of said tank body, and said baffle being of lesser area than the cross-sectional area of said tank to provide for movement of fuel longitudinally within said tank while cooperating with said brackets to reinforce the middle portion of said tank under loaded conditions.

4. A fuel tank assembly of the character described adapted for mounting on a motor vehicle frame, comprising an elongated body adapted for mounting horizontally of said frame, one side of said body being flattened over a substantial area thereof, the side opposite said flattened side being cylindrically curved, said body having flattened top and bottom portions joined to said flattened and curved sides to support said sides in spaced relation, the total lateral extent of said body being substantially less than the corresponding dimension of a uniformly cylindrical tank of substantially the same length and capacity, a pair of brackets for securing said tank to said frame, each said bracket including a generally C-shaped portion of substantially rigid material having upper and lower arms adapted to engage said top and bottom portions of said tank and a straight intermediate portion adapted to engage said flattened side of said tank, said lower arm extending laterally with respect to said intermediate portion in underlying and supporting relation with the underside of said tank body, an adjustable strap member for connecting the outer ends of said arms of each said bracket to encircle said tank and to hold said tank in said bracket, means for securing each said bracket to said frame with said upper arm in predetermined vertically spaced relation with said frame to provide increased vertical and horizontal operating clearance and with said lower arm of said bracket in supporting relation with said tank, a baffle located within said tank substantially equidistant the ends thereof and arranged transversely of the longitudinal axis thereof, means securing said baffle to said flattened side and said top and bottom portions of said tank body, and said baffle being of lesser area than the cross-sectional area of said tank to provide for movement of fuel longitudinally within said tank while cooperating with said brackets to reinforce the middle portion of said tank under loaded conditions.

5. A mounting assembly of the character described for use with a pair of fuel tanks adapted for mounting at either side of the frame of a motor vehicle, comprising a pair of brackets for supporting each said tank, means for securing each said bracket to said frame, means forming a platform adapted to extend across said frame between said brackets, and bracket plates for securing said platform means to said brackets, said bracket plates being formed to coincide with the configuration of adjacent portions of said tanks and brackets to overlap the space between each said tank and said platform means for adapting said assembly to motor vehicle frames of different widths.

6. A mounting assembly of the character described for use with a pair of fuel tanks adapted for mounting at either side of the frame of a motor vehicle, comprising a pair of brackets for supporting each said tank, means for securing each said bracket to said frame, a tool box adapted to extend across said frame between said brackets and including a cover forming a platform, and bracket plates for securing said tool box to said brackets, said bracket plates being formed to coincide with the configuration of adjacent portions of said tanks and brackets to overlap the space between each said tank and said tool box for adapting said assembly to motor vehicle frames of different widths.

7. A mounting assembly of the character described for use with a pair of fuel tanks adapted for mounting at either side of the frame of a motor vehicle comprising a pair of brackets for supporting each said tank, means for securing each said bracket to said frame, means forming a platform adapted to extend across said frame between said brackets, and means for connecting said platform means to each said bracket, said platform means including a pair of members arranged in telescoping relation laterally of said frame to adapt said assembly to frames of different widths.

8. A bracket for use in mounting a fuel tank of the character described on the frame of a motor vehicle and comprising a generally C-shaped member of substantially rigid material including upper and lower arm portions and an intermediate portion, said member having an integral channeled rib extending outwardly therefrom and substantially centrally thereof along substantially the entire length thereof to provide stiffness, said arms and said intermediate portion each including flattened inner surfaces on both sides of said rib for close engagement with the surface of said tank, means for securing said bracket to said frame with said upper arm in predetermined vertically spaced relation with said frame, and an adjustable strap member for connecting the outer ends of said arms to encircle said tank and to hold said tank in said bracket.

9. A bracket for use in mounting a fuel tank of the character described on the frame of a motor vehicle and comprising a generally C-shaped member of substantially rigid material formed to receive and engage portions of said tank, said member having an integral channeled rib extending outwardly therefrom and substantially centrally thereof along substantially the entire length thereof to provide stiffness, the outer surface of said rib including a straight portion intermediate the ends thereof and adapted to engage the side frame of a motor vehicle to support said tank in closely spaced relation with said frame, said straight rib portion having holes therethrough to receive mounting bolts for attachment to said frame, and an adjustable strap member for connecting the outer ends of said arms to encircle said tank and to retain said tank within said bracket.

10. A bracket for use in mounting a fuel tank of the character described on the frame of a motor vehicle and comprising a generally C-shaped member of substantially rigid material including upper and lower arm portions and an intermediate portion, said member having an integral channeled rib extending outwardly therefrom and substantially centrally thereof along substantially the entire length thereof to provide stiffness, said rib being adapted to abut the side frame of a motor vehicle and having a hole therethrough in predetermined vertically spaced relation with said upper arm for receiving a mounting bolt to locate said upper arm in predetermined vertically spaced relation with said frame, said rib having a slot therethrough spaced vertically from said hole for adjustably receiving an additional mounting bolt to accommodate said bracket to frames of different dimensions, and an adjustable strap member for connecting the outer ends of said arms to encircle said tank and to retain said tank within said bracket.

11. A fuel tank assembly of the character described for a motor vehicle, comprising an elongated body having one flat side of substantial width, the side of said body opposite said flat side being cylindrically curved, said body having flat top and bottom portions joining said flat and curved sides to support said sides in spaced relation, the width of said flat side and of said flat top and bottom portions of said body being correlated with the radius of said curved side to provide a total capacity for said tank substantially greater than the capacity of a uniformly cylindrical tank of substantially the same length and of the same radius of curvature as said curved side, the width of said body at the vertical center thereof being less than twice the radius of a cylindrically curved tank of the same length and capacity to reduce the width of said tank with respect to the width of said uniformly cylindrical tank of the same length and capacity, supporting brackets for said tank secured thereto adjacent opposite ends thereof and including portions engaging said flattened side and said top and bottom portions of said tank, means on said brackets for supporting said brackets in vertical position to maintain said flat side of said tank substantially vertical, a baffle located within said tank substantially equidistant the ends thereof and arranged transversely of the longitudinal axis thereof, means securing said baffle to said flattened side and said top and bottom portions of said tank body, and said baffle being of lesser area than the cross-sectional area of said tank to provide for movement of fuel longitudinally within said tank while cooperating with said brackets to reinforce the middle portion of said tank under loaded conditions.

12. A fuel tank assembly of the character described adapted for mounting on a motor vehicle frame having a flat vertical outer face, comprising an elongated body having one flat side of substantial width, brackets adjacent opposite ends of said tank body for securing said body horizontally on said frame with said flat side in close fitting relation with said flat frame face to minimize the projection of said body laterally of said frame, the side of said body opposite said flat side being cylindrically curved about a radius substantially equal to one-half the width of said body at the vertical center thereof, said body having flat top and bottom portions and having cylindrically curved corner portions connecting said flat top and bottom portions with said flat side, each of said corner portions being substantially 90° in angular extent and being tangent with the adjacent said flat portion and flat side of said body to provide substantially greater capacity in said tank than the capacity of a uniformly cylindrical tank of substantially the same length and of the same radius of curvature as said curved side while reducing the projection of said tank laterally of said flat frame face with respect to the corresponding lateral projection of a uniformly cylindrical tank of the same length and capacity, a baffle located within said tank substantially equidistant the ends thereof and arranged transversely of the longitudinal axis thereof, said baffle being of lesser area than the cross-sectional area of said tank to provide for movement of fuel longitudinally within said tank, and means rigidly securing portions of said baffle to said flattened side and to said top and bottom portions of said tank body for cooperation with said brackets to reinforce the middle portion of said tank under loaded conditions.

FRED PRIOR.

REFERENCES CITED

The following references are of record in the file of this patent:

UNITED STATES PATENTS

| Number | Name | Date |
|---|---|---|
| 951,239 | Garrett | Mar. 8, 1910 |
| 1,327,223 | Boyle | Jan. 6, 1920 |
| 2,090,059 | McClane | Aug. 17, 1937 |
| 2,208,621 | Ball | Sept. 20, 1937 |
| 2,357,148 | Turner | Aug. 29, 1944 |
| 2,465,173 | Scales | Mar. 22, 1949 |